(12) United States Patent
Kunzmann et al.

(10) Patent No.: US 8,825,427 B2
(45) Date of Patent: Sep. 2, 2014

(54) METHOD FOR CALIBRATING A COORDINATE MEASURING MACHINE

(75) Inventors: Steffen Kunzmann, Dresden (DE); Tobias Held, Noerdlingen (DE); Thomas Engel, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 971 days.

(21) Appl. No.: 12/783,021

(22) Filed: May 19, 2010

(65) Prior Publication Data

US 2011/0040514 A1   Feb. 17, 2011

Related U.S. Application Data

(63) Continuation of application No. PCT/EP2008/009494, filed on Nov. 11, 2008.

(30) Foreign Application Priority Data

Nov. 20, 2007   (DE) .......................... 10 2007 057 093

(51) Int. Cl.
  *G01C 17/38* (2006.01)
  *G01B 21/04* (2006.01)

(52) U.S. Cl.
  CPC .................... *G01B 21/042* (2013.01)
  USPC .................. 702/95; 702/94; 702/85

(58) Field of Classification Search
  USPC .............................. 702/95, 85, 94
  See application file for complete search history.

(56) References Cited

U.S. PATENT DOCUMENTS

| | | | |
|---|---|---|---|
| 7,900,367 B2 * | 3/2011 | Sutherland | 33/502 |
| 2002/0029119 A1 * | 3/2002 | Lotze et al. | 702/95 |
| 2005/0154548 A1 | 7/2005 | Basel et al. | |
| 2008/0195343 A1 * | 8/2008 | Osterlund et al. | 702/95 |
| 2009/0128546 A1 * | 5/2009 | Masuda | 345/419 |

FOREIGN PATENT DOCUMENTS

| | | |
|---|---|---|
| DE | 44 39 578 C1 | 2/1996 |
| EP | 1 051 596 B1 | 3/2002 |
| EP | 1 528 353 A1 | 5/2005 |
| WO | WO 2005/071350 A1 | 8/2005 |
| WO | WO 2006132046 A1 * | 12/2006 |

* cited by examiner

*Primary Examiner* — John Breene
*Assistant Examiner* — Stephanie Bloss
(74) *Attorney, Agent, or Firm* — Harness, Dickey & Pierce, P.L.C.

(57) ABSTRACT

A reference measurement object having known properties is used for the purpose of calibrating a coordinate measuring machine. A plurality of reference measured values are picked up on the reference measurement object. Calibration data are determined using the reference measured values and using the known properties of the reference measurement object. The calibration data comprises a first number of polynomial coefficients that are selected to correct nonlinear measuring errors using at least one polynomial transformation. The first number of polynomial coefficients is reduced in an iterative method to a lesser second number, with a plurality of pairs of polynomial coefficients being formed and with a polynomial coefficient of a pair being eliminated in each case when a statistical dependence between the polynomial coefficients of the pair is greater than a defined threshold value.

15 Claims, 3 Drawing Sheets

METHOD FOR CALIBRATING A COORDINATE MEASURING MACHINE

CROSS REFERENCES TO RELATED APPLICATIONS

This application is a continuation of international patent application PCT/EP2008/009494 filed on Nov. 11, 2008 designating the U.S., which international patent application has been published in German language and claims priority from German patent application DE 10 2007 057 093.9 filed on Nov. 20, 2007. The entire contents of these priority applications are incorporated herein by reference.

BACKGROUND OF THE INVENTION

The present invention relates to a method for calibrating a coordinate measuring machine and to a coordinate measuring machine where such a method is implemented.

Coordinate measuring machines have a sensor that can move relative to a measurement object. The measurement object is typically placed on a measuring table or another suitable reception. The sensor is brought into a defined position relative to the measurement object. Subsequently, spatial coordinates of defined measuring points are determined on the measurement object by evaluating the position of the sensor in the measuring volume and, if appropriate, further measured data supplied by the sensor. Such a coordinate measuring machine can be used to determine geometric dimensions including shape and contour profiles of the measurement object by picking up the spatial coordinates at a plurality of measuring points. A typical application for coordinate measuring machines is therefore in quality control of workpieces.

In many cases, coordinate measuring machines have a so-called tactile measuring sensor. This is a sensor having a sensor base that can be moved relative to the measurement object. The sensor further has a probe element, often in the form of a probe pin by means of which contact with a measuring point on the measurement object is made. The probe element can move relative to the sensor base such that it is deflected during contact of a measuring point. Measuring elements in the sensor serve for determining these deflections relative to the sensor base in order to enable a high measuring accuracy. As a rule, the deflections of the probe element relative to the sensor base are transformed using a so-called transformation matrix into a coordinate system that specifies the position of the sensor in the measuring volume. The coefficients of the transformation matrix are calculated in a calibration operation, wherein reference measured values are picked up on a reference measurement object having known properties.

EP 1 051 596 B1 discloses such a calibration method, wherein the position and the radius of a probe ball arranged on the end of the probe pin are determined first, and wherein the coefficients of the transformation matrix are subsequently calculated. The method according to EP 1 051 596 B1 furthermore provides that a plurality of further reference measured values are used to determine an error table that represents measurement deviations as a function of the magnitude of the deflection of the probe element and as a function of the respective measuring position. This error table can be provided in the form of a so-called look-up table or, alternatively, in the form of a polynomial function with polynomial coefficients. In the latter case, the polynomial function serves for correcting nonlinear measurement deviations by computing a linearization for the nonlinear behavior of the sensor system with the aid of the polynomial function.

Consequently, calibration includes not only the determination of the coefficients for the transformation matrix, but also the determination of suitable polynomial coefficients that represent the remaining, nonlinear measurement deviations.

The method according to EP 1 051 596 B1 requires a high number of reference measured values and is therefore rather time-consuming. This is disadvantageous, because it is often necessary to repeat a calibration during operation of the coordinate measuring machine in order to enable high accuracy measurements.

In order to speed up the calibration of a coordinate measuring machine having a measuring sensor, it is desirable to minimize the number of parameters or coefficients which have to be determined by means of the calibration. The fewer parameters/coefficients need to be determined, the fewer reference measured values are required. On the other hand, minimization should not lead to significant measurement deviations being overlooked.

It has emerged from the search for an improved calibration method that a polynomial transformation for correcting nonlinearities can in part cause intensive measurement deviations at points that are not supported by reference measured values. In other words, a polynomial transformation can cause "new" nonlinear measurement deviations even when the polynomial transformation yields very good correction results at those interpolation points that are supported by reference measured values.

SUMMARY OF THE INVENTION

Against this background, it is an object of the present invention to provide a method for calibrating a coordinate measuring machine by means of which measuring errors resulting from nonlinear system behavior can be corrected more easily and with higher accuracy.

It is another object to provide a robust calibration method that enables an accurate measurement even away from the measuring positions supported by reference measured values.

It is yet another object to provide a coordinate measuring machine where a calibration method of the afore-mentioned kind can easily be carried out.

In accordance with one aspect of the invention, there is provided a method for calibrating a coordinate measuring machine, comprising the steps of: providing a reference measurement object having known properties in a measuring volume of the coordinate measuring machine, recording a plurality of reference measured values on a plurality of measurement points on the reference measurement object, and determining calibration data using the reference measured values and using the known properties, wherein the step of determining calibration data comprises the steps of defining a polynomial transformation having a plurality of polynomial coefficients in order to computationally correct for nonlinear measuring errors of the coordinate measuring machine, determining a first number of said polynomial coefficients as a function of the reference measured values and as a function of the known properties, forming a plurality of pairs of said polynomial coefficients, and eliminating at least some of said polynomial coefficients by eliminating one of the polynomial coefficients of each pair when a statistical dependence between the polynomial coefficients of said pair is greater than a defined threshold value, thereby reducing the first number of said polynomial coefficients to a reduced second number, and iteratively repeating said step of eliminating until statistical dependences among the polynomial coefficients of the reduced second number are substantially eliminated.

According to another aspect, there is provided a method for calibrating a coordinate measuring machine, comprising the steps of: providing a reference measurement object having known properties in a measuring volume of the coordinate measuring machine, recording a plurality of reference measured values on the reference measurement object, and determining calibration data using the reference measured values and using the known properties, with the calibration data comprising a first number of polynomial coefficients for a polynomial transformation designed to correct for nonlinear measuring errors of the coordinate measuring machine, wherein the first number of polynomial coefficients is reduced in an iterative method to a lesser second number by forming a plurality of pairs of polynomial coefficients, and by eliminating a polynomial coefficient from each pair when a statistical dependence between the polynomial coefficients of said pair is greater than a predefined threshold value.

According to yet another aspect, there is provided a coordinate measuring machine comprising a reception for a measurement object, comprising a sensor for generating position-dependent measured values of the measurement object, and comprising an evaluation and control unit for controlling the sensor and for processing the measured values, wherein the evaluation and control unit is designed for determining calibration data using a reference measurement object having known properties, and wherein the calibration data comprises a number of polynomial coefficients that are selected for correcting nonlinear measuring errors of the coordinate measuring machine using at least one polynomial transformation, wherein the evaluation and control unit is further designed for reducing a first number of polynomial coefficients in an iterative method to a lesser second number by forming a plurality of pairs of polynomial coefficients, and by eliminating a polynomial coefficient from each pair when a statistical dependence between the polynomial coefficients of said pair is greater than a defined threshold value.

The novel methods are advantageously implemented in the form of a computer program having program code that is stored on a suitable data medium and is designed for executing the novel calibration method when the program code runs in an evaluation and control unit of a coordinate measuring machine.

The novel calibration methods are still based on the idea of using a polynomial transformation to correct nonlinear measuring errors of a coordinate measuring machine. It has emerged, however, that the quality of the correction is strongly dependent on which and how many polynomial coefficients are determined in the course of the calibration. It has emerged that an excessively large number of polynomial coefficients leads to transformation equations that can cause intensive nonlinear deviations at other points although they yield good correction results at those points that are supported by reference measured values. This can be avoided by using an "optimum" set of polynomial coefficients for a specific calibration task. The difficulty consists in finding this "optimum" set of polynomial coefficients. The novel calibration method makes it possible to overcome this difficulty by using an iterative method for optimizing the number of polynomial coefficients used. In this process, "unnecessary" polynomial coefficients are eliminated from a set of polynomial coefficients initially provided. In particular, polynomial coefficients that have a strong statistical dependence on at least one other polynomial coefficient are eliminated. In other words, those polynomial coefficients are eliminated which do not yield an appreciable independent component for the correction of the nonlinear measurement deviations. It has emerged that the calibration data determined in this way enable more accurate measuring results at points that are not supported by reference measured values, without significantly impairing the accuracy at the measuring positions supported by reference measured values.

The novel method allows to determine a reduced set of polynomial coefficients for correcting nonlinear measuring errors without impairing the accuracy of the measurements with the calibration data. In addition, the selection and determination of the polynomial coefficients are self learning. Consequently, the novel method automatically adapts to different measurement environments. There is a consequent reduction in the outlay for the calibration. Moreover, the knowledge obtained by the iterative process can advantageously be used during future calibration tasks with comparable measurement conditions in order to specifically reduce, from the very start, the number of the correction coefficients to be determined. Each calibration operation therefore supplies a priori knowledge for future calibration operations, and this can be used to further speed up calibration operations.

In summary, the novel methods offer a simple, fast and robust calibration of a coordinate measuring machine having a multidimensional, nonlinear sensor unit.

In a preferred refinement, a correlation value is determined as a measure of the statistical dependence for each pair of polynomial coefficients, with the correlation value representing a cross correlation between the polynomial coefficients of the pair.

In preferred exemplary embodiments of this refinement, the so-called correlation coefficient between the two polynomial coefficients of each pair is determined. The correlation coefficient is a characteristic number normalized to the respective standard deviations of the polynomial coefficients. It can lie between $-1$ and 1. It is a measure of the linear statistical dependences between the two polynomial coefficients of a pair. However, instead of using the correlation coefficient it would also be possible to use another variable mathematically related thereto such as, for example, the (unnormalized) covariance. In general, this refinement is restricted to the analysis of linear statistical dependences between the polynomial coefficients of each pair. This refinement simplifies and speeds up the calibration operation, and it yields good results with reference to the accuracy and robustness of the calibration data. However, it is also possible in principle to make use of higher order statistical dependences in other refinements.

In a further refinement, the correlation value is compared in absolute terms (i.e. as an absolute value) with a threshold value that represents a cross correlation greater than 0.4, preferably greater than 0.6, and even more preferably greater than approximately 0.8.

In this refinement, one of the polynomial coefficients of the pair is eliminated when the absolute value of the correlation coefficient for the two polynomial coefficients is greater than the specified threshold values. Practical investigations have shown that elimination of one of the polynomial coefficients of the pair lead to the desired advantages when the linear statistical dependence exceeds the specified threshold values.

In a further refinement, each polynomial coefficient represents a polynomial order, with that polynomial coefficient of the pair being eliminated that represents a higher polynomial order in each case.

The polynomial order specifies the power of the respective polynomial term that appears in the polynomial transformation. According to this refinement, there is eliminated from two correlated polynomial coefficients the one that is allocated to a higher polynomial order in each case. If two correlated polynomial coefficients each represent equal polynomial orders, it is possible to eliminate one of the two, without a preferred priority. In the case of different polynomial orders, by contrast, it is advantageous to eliminate the polynomial coefficient of higher polynomial order, because the calibration is thereby made more robust, i.e. the calibration data can be used with a higher accuracy and reliability even for measuring positions that are not supported by reference measured values.

In a further refinement, the calibration data further comprise transformation coefficients of a transformation matrix that represents a linear relationship between the reference measured values and the known properties.

This refinement is particularly advantageous for coordinate measuring machines where a measuring sensor provides multidimensional measured values. Alternatively, the novel calibration method can also be used for simpler coordinate measuring machines where only a touch-trigger probe head is used. The novel calibration can then be limited, for example, to the correction of guiding errors along the movement axes of the probe head. In the preferred refinement, however, the calibration also supplies calibration data for the transformation of the sensor measured data into the coordinate system of the coordinate measuring machine. Since such coordinate measuring machines with "measuring sensors" are generally used for measurement tasks with particularly high demands placed on the measuring accuracy, the novel calibration method is particularly well suited for such coordinate measuring machines.

In a further refinement, a plurality of pairs each having a polynomial coefficient and a transformation coefficient are formed, with the polynomial coefficient of such a pair being eliminated when a statistical dependence between the polynomial coefficient and the transformation coefficient of the pair is greater than a defined threshold value.

In this refinement, polynomial coefficients that serve to linearize the measured values are eliminated even when a significant correlation exists with coefficients of the transformation matrix. This refinement eliminates further statistical dependences between the calibration data, and it therefore enables a particularly robust, fast and accurate error correction.

In a further refinement, a characteristic value that represents a quality criterion for the coordinate measuring machine is determined as a function of the difference between the first and the second number.

This refinement makes advantageous use of the information that results from the minimization of the polynomial coefficients. For example, a low second number or a large difference between the first and second number indicates that the corresponding coordinate measuring machine has only relatively slight nonlinearities so that it is generally suitable for high accuracy measurements. The same holds true for a multidimensional sensor where only a low number of polynomial coefficients are left after the elimination of the statistically dependent polynomial coefficients. Furthermore, individual measuring points can be assigned an information item relating to the local measurement uncertainty as a function of the remaining polynomial coefficients.

In a further refinement, the eliminated polynomial coefficients are provided in a knowledge database together with parameter data that represent the coordinate measuring machine.

The parameter data include, in particular, information relating to the properties of the calibrated coordinate measuring machine and/or of the sensor, such as, for example, the weight and/or the length of the probe element used, the frame structure (for example horizontal arm, portal, bridge) of the coordinate measuring machine etc. When specific polynomial coefficients have been eliminated according to the novel method, this information together with the parameter data can provide advantageous a priori knowledge for future calibration operations, thereby allowing to dispense with the eliminated polynomial coefficients from the very start, if appropriate. Consequently, this refinement enables a further simplification in the calibration of coordinate measuring machines.

In a further refinement, the reference measured values are picked up by means of a tactile sensor that has a sensor base, a probe element movable relative to the sensor base, and a number of measuring elements that are designed for determining a relative position of the probe element relative to the sensor base, with the polynomial coefficients representing nonlinear properties of the measuring elements.

Calibration of a measuring tactile sensor on a coordinate measuring machine using the methods known so far is particularly complicated, since there is a large number of degrees of freedom that have to be taken into account in the calibration. Using the novel calibration method, the outlay for the calibration of such a tactile measuring sensor can be greatly reduced without impairing the high measuring accuracy that is basically possible. The application of the novel method in the case of a tactile measuring sensor is therefore a particularly preferred case.

In a further refinement, the reference measured values are picked up by means of a non-contact measuring sensor. For example, this can be an optical, camera-based sensor and/or a capacitive proximity sensor.

Although the novel methods have been developed first and foremost to solve problems in the calibration of coordinate measuring machines having tactile measuring sensors, they can also advantageously be used with other multidimensional sensors. As has been shown, the iterative elimination of polynomial coefficients as a function of their statistical dependences also leads to a reduction in the calibration outlay and to more robust calibration data in the case of such sensors.

It goes without saying that the above features, and those still to be explained below, can be used not only in the respectively specified combinations, but also in other combinations or on their own, without departing from the scope of the present invention.

BRIEF DESCRIPTION OF THE DRAWINGS

Exemplary embodiments of the invention are illustrated in the drawing and explained in more detail in the following description. In the drawing.

DESCRIPTION OF PREFERRED EMBODIMENTS

Figure 1:
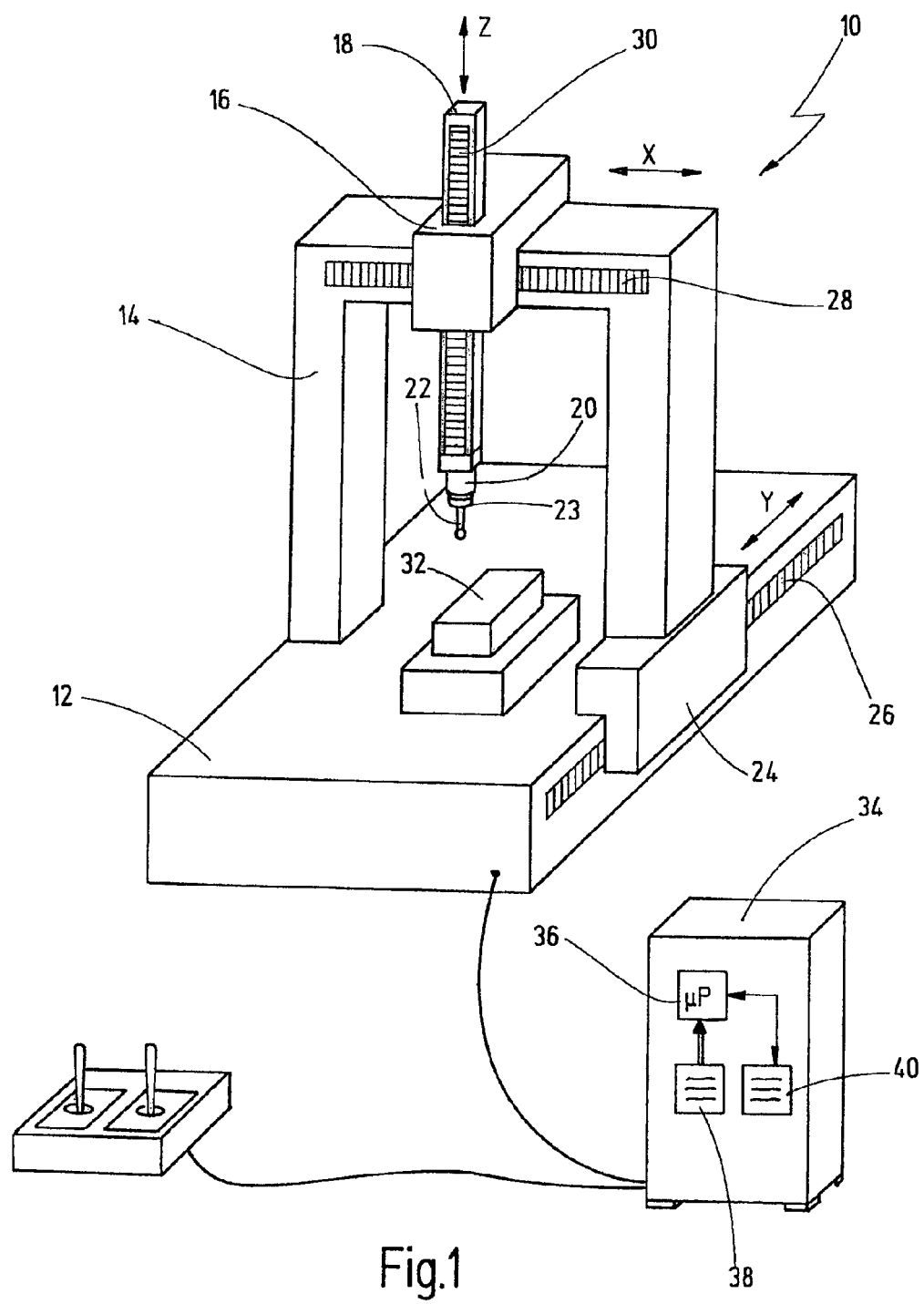
FIG. 1 shows a simplified illustration of a coordinate measuring machine according to an exemplary embodiment of the invention.

In FIG. 1, reference numeral 10 designates a coordinate measuring machine in its entirety. By way of example, this is a coordinate measuring machine in portal design that is specifically made for measuring workpieces. However, the invention is not restricted to coordinate measuring machines in the narrower sense, and it can also be used, for example, with machine tools or other machines where multidimensional spatial coordinates of a measurement object are determined using a suitable sensor. Consequently, the term "coordinate measuring machine" also includes such machines in the scope of the present invention.

The coordinate measuring machine 10 has a base 12 on which a portal 14 is arranged. Seated on the upper transverse beam of the portal 14 is a carriage 16 that supports a quill 18. A sensor head 20 is arranged on the lower free end of the quill 18. Here, the sensor head 20 is a tactile measuring sensor head with a holder for a probe pin 22 that can be pivoted relative to the holder. Reference numeral 23 denotes a measuring element (illustrated here only schematically) by means of which the deflections of the probe pin 22 relative to the holder can be determined.

Arranged at the foot of the portal 14 is a drive 24 that is designed to move the portal 14 in a longitudinal direction. This longitudinal direction is usually denoted as the y-axis. The position of the portal 14 relative to the base 12 can be determined by means of a measuring system 26. Measuring system 26 is typically a glass scale which can be scanned by means of a suitable sensor (not illustrated here).

In the same way, carriage 16 can be moved relative to portal 14 in a direction that is usually denoted as x-axis. Furthermore, quill 18 can be moved relative to carriage 16 along a direction that is usually denoted as z-axis. The respective spatial position of carriage 16 and quill 18 can be determined by means of further measuring systems 28, 30. Overall, sensor head 20 can be moved inside a measuring volume using the drive of the portal 14, of the carriage 16 and of the quill 18, with said measuring volume being defined by the maximum travels of the portal 14, the carriage 16 and the quill 18.

A measurement object 32 is arranged on the base 12 inside the measuring volume. In order to carry out a measurement, the sensor head 20 is moved to the measurement object 32 until the probe ball on the free lower end of probe pin 22 comes into contact with a desired measuring point on the measurement object 32. The contact is detected with the aid of the deflection of the probe pin relative to the base of the sensor head. The spatial coordinates of the scanned measuring point result from the respective positions along the axes x, y and z and from the deflection of the probe pin 22.

The guide paths of the coordinate measuring machine 10 along the axes x, y and z, and also the deflections of the probe pin 22 can vary because of manufacturing tolerances, temperature fluctuations, ageing influences etc. Furthermore, the measurement results of the sensors along these movement axes exhibit nonlinearities. Consequently the coordinate measuring machine 10 must be calibrated before a measurement is carried out by measuring a reference measurement object having known properties. By comparing the reference measured values with the known properties of the reference measurement object, it is possible to determine calibration data that are used for subsequent measurements on real measurement objects in order to correct systematic measuring errors.

Denoted by reference numeral 34 is an evaluation and control unit that controls the movements of the sensor head 20, records the measured values of the measuring elements 23 and the measuring systems 26, 28, 30, and processes them. Moreover, the evaluation and control unit 34 can also be used to carry out the calibration operation. In preferred exemplary embodiments, the evaluation and control unit 34 includes a processor 36 and at least two memories 38, 40. Stored in the memory 38 is a computer program that is designed, in the preferred exemplary embodiment, for carrying out a calibration method such as is explained below with reference to FIGS. 3 to 4. Stored in the memory 40 are, inter alia, the calibration data that are determined in the course of the calibration operation.

Figure 2:
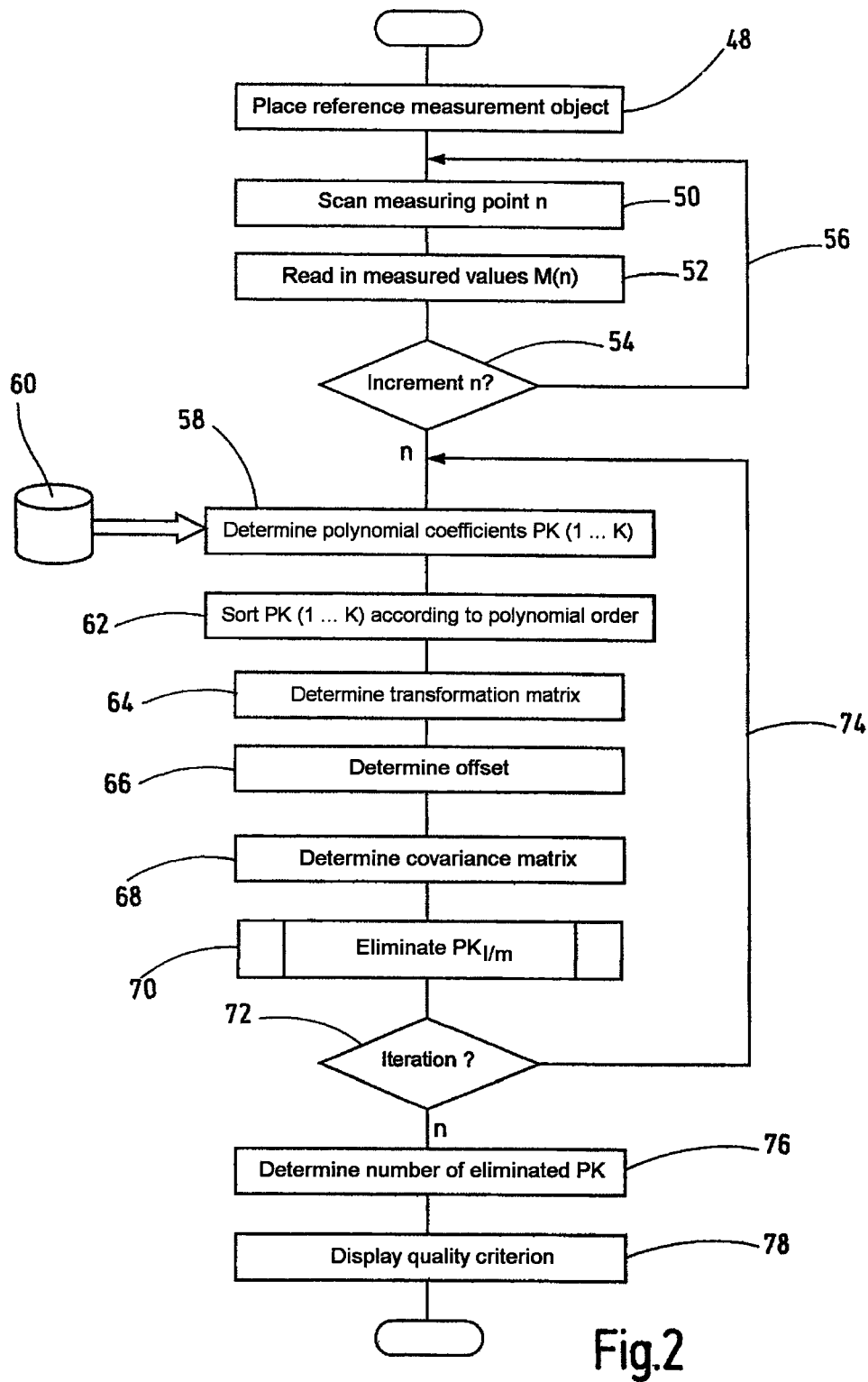
FIG. 2 shows a flowchart for explaining an exemplary embodiment of the novel method.

In accordance with FIG. 2, the calibration method for calibrating the sensor head here begins with positioning (step 48) a reference measurement object 32 having known properties inside the measuring volume. The reference measurement object is, or frequently includes, a ball having a known radius R, as is described in EP 1 051 596 B1 mentioned at the beginning. In accordance with step 50, a measuring point n on the reference measurement object is touched, and in accordance with step 52 the measured values S(n) of the measuring elements 23 and measuring systems 26, 28, 30 are recorded. In accordance with step 54, it is decided whether measured data are to be picked up for further measuring points n. If appropriate, the method returns to step 50 in accordance with loop 56.

When the measured data have finally been picked up, in accordance with step 58 polynomial coefficients PK(1 ... K) are determined for a polynomial transformation with the aid of which the measured data S(n) are linearized. Both the number and the respective value of the polynomial coefficients are initially unknown. For this reason, a polynomial of the following type is firstly used, by way of example:

$$S'=(S_1+C_{11} \cdot S_1 \cdot S_2+C_{12} \cdot S_1 \cdot S_3+C_{13} \cdot S_1 \cdot S_1 \cdot S_2+ \ldots$$

$$S_2+C_{21} \cdot S_2 \cdot S_1+C_{22} \cdot S_2 \cdot S_3+ \ldots ,$$

$$S_3+C_{31} \cdot S_3 \cdot S_1+C_{32} \cdot S_3 \cdot S_2+ \ldots ),$$

$S_1$, $S_2$, $S_3$ being measured data of the measuring elements of the sensor head at the measuring point n, and $C_{11}$, $C_{12}$, $C_{13}$ representing the polynomial coefficients of the polynomial.

S' denotes the linearized three-dimensional measuring signal of the measuring elements after the polynomial transformation. As a function of a priori knowledge, which can be taken from a knowledge database 60, polynomial terms that are known to not be needed can be eliminated from the very start by setting the appropriate polynomial coefficient to zero.

The polynomial coefficients are calculated by minimizing a target function. In preferred exemplary embodiments, the target function is the least square minimization of all the error squares between the reference measured values and the known properties of the reference measurement object. This way of calculating polynomial coefficients is known to the relevant persons skilled in the art.

In accordance with step 62, the calculated polynomial coefficients PK(1 ... K) are subsequently sorted, with the polynomial order providing the sorting criterion here. In accordance with steps 64 and 66, a transformation matrix and a so-called offset are then determined from the measured data. The transformation matrix contains transformation coefficients by means of which the (linearized) measured data of the measuring elements 23, i.e. the deflections of the probe pin 22, are transformed into the coordinate system of the coordinate measuring machine 10 having the coordinate axes x, y and z. The offset specifies the center of the probe ball at the free end of the probe pin 22. The calculation of the transformation matrix and of the offset are likewise known to the relevant persons skilled in the art and are, for example, described in EP 1 051 596 B1 mentioned at the beginning, which is incorporated by reference here to its full extent.

In accordance with step 68, a covariance matrix is then determined, which covariance matrix includes all the covariances between all the calculated polynomial coefficients. The covariance matrix can advantageously include the covariances relating to all further calculated values, in particular the transformation coefficients.

In accordance with step 70, pairs each having two polynomial coefficients $PK_l$ and $PK_m$ are subsequently formed. The polynomial coefficients $PK_l$ and $PK_m$ are examined for statistical dependences, as is explained in more detail below with reference to FIG. 3. If the statistical dependences of the polynomial coefficients of such a pair exceed a predefined threshold value, one of the polynomial coefficients is eliminated. It is preferred to eliminate that polynomial coefficient of the pair which represents a higher polynomial order according to the sequence formed in step 62. Subsequently, it is decided in accordance with step 72 whether a further iteration step is useful. If it is, the method returns to step 58 in accordance with loop 74, and the (remaining) polynomial coefficients, the transformation coefficients and the offset can be calculated again. In this process, however, all previously eliminated polynomial coefficients are set to zero, i.e. the polynomial for the linearization is simplified with each iteration step.

The iteration loops 74 are terminated when the iteration steps no longer result in significant changes. In preferred variants of the method, the number of the eliminated polynomial coefficients, and also the number of the remaining polynomial coefficients are determined (step 76). In accordance with step 78, the number of the remaining polynomial coefficients and/or the number of the eliminated polynomial coefficients are/is displayed as a measure of a quality criterion of the coordinate measuring machine 10. It goes without saying that the calculated coefficients are also stored in the memory 40 of the evaluation and control unit 34, and so they are available as calibration data that can be used to correct systematic errors in the case of subsequent measurements.

Figure 3:
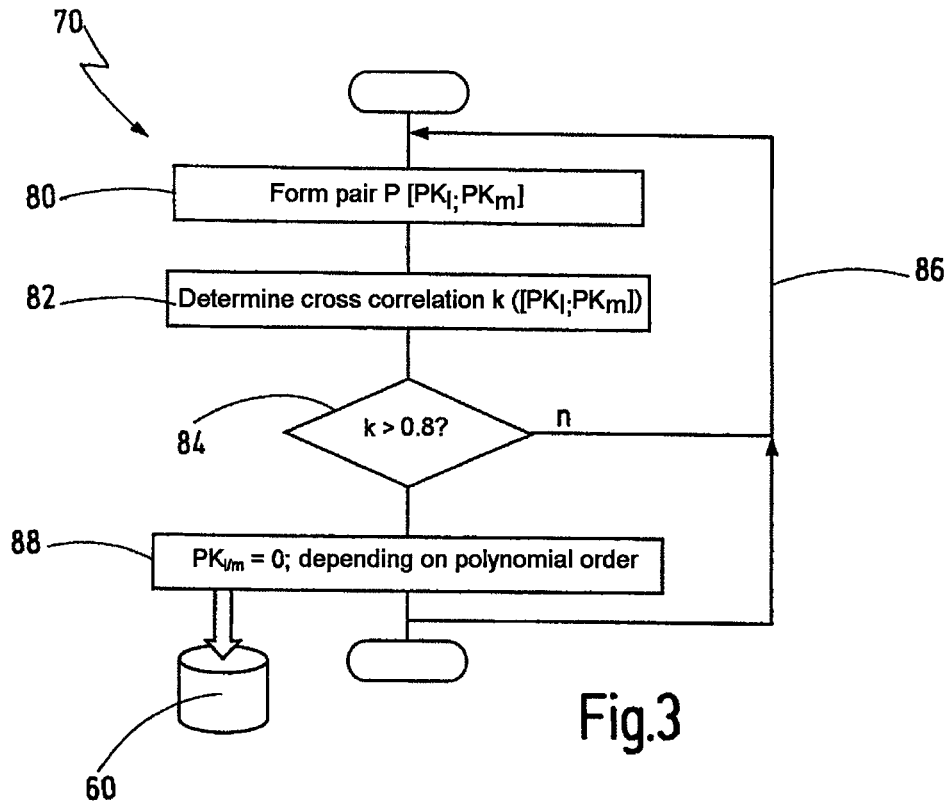
FIG. 3 shows a flowchart for explaining a first variant of the method according to FIG. 2.

FIG. 3 shows a further flowchart illustrating the method steps that lead in preferred exemplary embodiments to the elimination of statistically dependent polynomial coefficients. Pairs $P[PK_l; PK_m]$ of polynomial coefficients $PK_l$ and $PK_m$ are formed in accordance with step 80. Subsequently, the cross correlation k ($[PK_l; PK_m]$) between the polynomial coefficients of the pair is determined in accordance with step 82. In accordance with step 84, the absolute value of the cross correlation k is then compared with a threshold value that is 0.8 in a preferred exemplary embodiment. The threshold value, however, can also be greater than or less than this. The greater it is, the larger the statistical dependences between the polynomial coefficients that are permitted, since in accordance with loop 86 the method returns to method step 80 when the threshold value is not exceeded. By contrast, if the threshold value is exceeded, one of the two polynomial coefficients of the pair is set to zero, i.e. it is eliminated (step 88). It is preferred to eliminate that polynomial coefficient which represents a higher polynomial order. Subsequently, the method returns to step 80 until a comparison of the cross correlation with the threshold value has taken place for all the pairs of polynomial coefficients. In preferred exemplary embodiments, eliminated polynomial coefficients are stored in the knowledge database 60 in order to provide a priori knowledge for future, similar calibration tasks.

Figure 4:
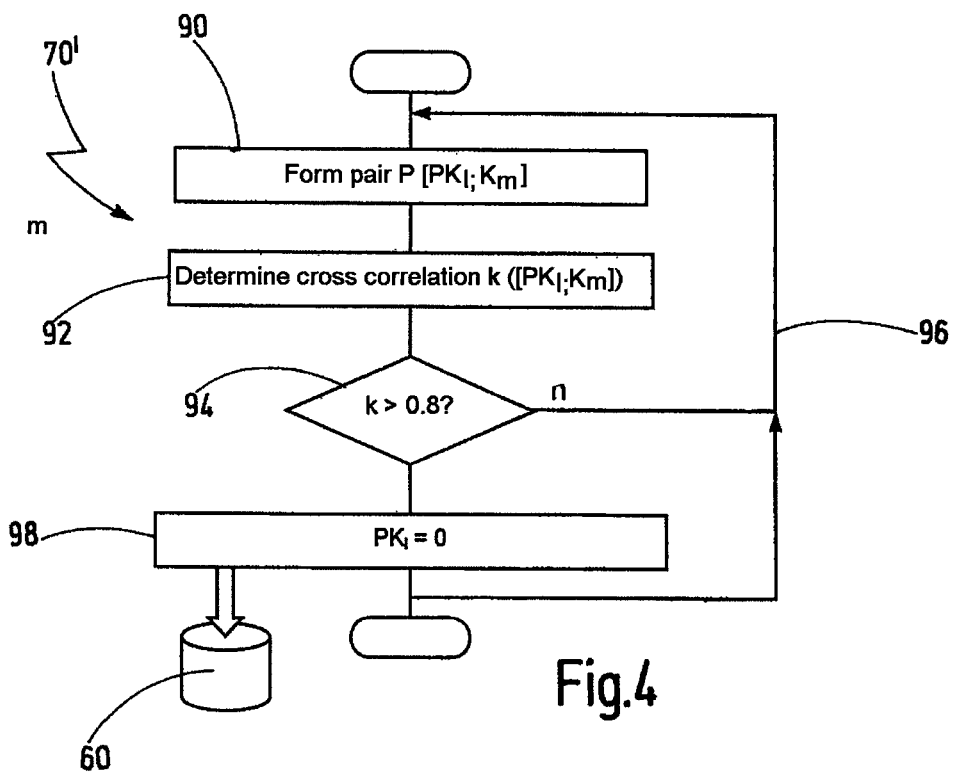
FIG. 4 shows a flowchart for explaining a second variant of the method from FIG. 2.

FIG. 4 shows an alternative method 79' for eliminating polynomial coefficients, the method according to FIG. 4 being used in preferred exemplary embodiments as a supplement to the method according to FIG. 3. In accordance with step 90 from FIG. 4, pairs P $[PK_l: K_m]$ each having a polynomial coefficient $PK_l$ and a transformation coefficient $K_m$ of the transformation matrix are formed. Alternatively and/or additionally, the coefficients of the offset vector can also be used to form pairs with respectively one polynomial coefficient. In accordance with step 92, the cross correlation of this pair is subsequently determined, and in accordance with step 94 is compared with a threshold value. If the cross correlation of the pair is above the threshold value, the corresponding polynomial coefficient $PK_l$ is set to zero in step 98. Otherwise, in accordance with loop 96 the method branches directly to the next pair. It goes without saying that the alternative in accordance with FIG. 4 is possible only when transformation coefficients and/or offset coefficients are actually provided. This is typically the case when calibration data are to be determined for a tactile measuring sensor. The novel method, however, can also be used in principle with other sensors and also independently of a specific sensor in order to calibrate coordinate measuring machines. For example, the novel method can be used to determine calibration data for correcting nonlinear guidance errors along the movement axes x, y, z of the coordinate measuring machine 10. Furthermore, the novel method can also be used to calibrate optical or other multidimensional sensors. In general, the novel method can be used in all cases in which dependences exist between the various coordinate axes of a multidimensional measuring system.

What is claimed is:

1. A method for calibrating a coordinate measuring machine having a sensor head and an evaluation and control unit that controls movements of the sensor head, the method comprising the steps of:

providing a reference measurement object having known properties in a measuring volume of the coordinate measuring machine, recording a plurality of reference measured values on a plurality of measurement points on the reference measurement object using the coordinate measuring machine, determining calibration data using the reference measured values and using the known properties, and storing said calibration data in a memory of said evaluation and control unit in order to enable the evaluation and control unit to computationally correct for nonlinear measuring errors of the coordinate measuring machine, wherein the step of determining calibration data is carried out using the evaluation and control unit and comprises the steps of:

defining a polynomial transformation having a plurality of polynomial coefficients, determining a first number of said polynomial coefficients as a function of the reference measured values and as a function of the known properties, forming a plurality of pairs of said polynomial coefficients, eliminating statistically dependent polynomial coefficients by eliminating one of the polynomial coefficients of each pair when a statistical correlation between the polynomial coefficients of said pair is determined to exceed a defined threshold value, thereby reducing the first number of said polynomial coefficients to a reduced second number, and iteratively repeating said step of eliminating such that statistical dependences among the polynomial coefficients of the reduced second number are reduced.

2. The method of claim 1, wherein a correlation value is determined for each pair of polynomial coefficients as a measure of the statistical dependence, with the correlation value representing a cross correlation between the polynomial coefficients of the pair.

3. The method of claim 2, wherein the correlation value is compared as an absolute value with a threshold value that represents a cross correlation greater than 0.4.

4. The method of claim 2, wherein the correlation value is compared as an absolute value with a threshold value that represents a cross correlation greater than 0.6.

5. The method of claim 2, wherein the correlation value is compared as an absolute value with a threshold value that represents a cross correlation greater than 0.8.

6. The method of claim 1, wherein each polynomial coefficient represents a polynomial order, and wherein that polynomial coefficient of each pair is eliminated that represents a higher polynomial order.

7. The method of claim 1, wherein the step of determining calibration data further comprises a step of defining a transformation matrix having transformation coefficients, the transformation matrix representing a linear relationship between the reference measured values and the known properties.

8. The method of claim 7, wherein a plurality of pairs each having a polynomial coefficient and a transformation coefficient are formed, with the polynomial coefficient of such a pair being eliminated when a statistical correlation between the polynomial coefficient and the transformation coefficient of the pair is determined to exceed a defined threshold value.

9. The method of claim 1, wherein a difference between the first and the second number is determined, and wherein the difference is provided as a characteristic value that represents a quality criterion for the coordinate measuring machine.

10. The method of claim 1, wherein eliminated polynomial coefficients are stored in a knowledge database in addition to parameter data that represent the coordinate measuring machine.

11. The method of claim 1, wherein the reference measured values are recorded using a tactile sensor that has a sensor base, a probe element movable relative to the sensor base, and a number of measuring elements which are designed to determine a relative position of the probe element relative to the sensor base, with the polynomial coefficients representing nonlinear properties of the measuring elements.

12. The method of claim 1, wherein the reference measured values are recorded by means of a non-contact measuring sensor.

13. A method for calibrating a coordinate measuring machine having a sensor head and an evaluation and control unit that controls movements of the sensor head, the method comprising the steps of:
providing a reference measurement object having known properties in a measuring volume of the coordinate measuring machine,
recording a plurality of reference measured values on the reference measurement object using the coordinate measuring machine,
determining calibration data using the reference measured values and using the known properties, with the calibration data comprising a first number of polynomial coefficients for a polynomial transformation designed to correct for nonlinear measuring errors of the coordinate measuring machine, and
storing said calibration data in a memory of said evaluation and control unit,
wherein the first number of polynomial coefficients is reduced in an iterative method to a lesser second number by forming a plurality of pairs of polynomial coefficients, and eliminating statistically dependent polynomial coefficients by eliminating a polynomial coefficient from each pair when a statistical correlation between the polynomial coefficients of said pair is determined to exceed a predefined threshold value,
wherein the calibration data stored in the memory only comprises the lesser second number of polynomial coefficients.

14. A coordinate measuring machine comprising:
a reception for a measurement object,
a sensor for generating position-dependent measured values of the measurement object, and
an evaluation and control unit for controlling the sensor and for processing the measured values,
wherein the evaluation and control unit is designed for determining calibration data using a reference measurement object having known properties,
wherein the calibration data comprises a number of polynomial coefficients that are selected for correcting nonlinear measuring errors of the coordinate measuring machine using at least one polynomial transformation, and
wherein the evaluation and control unit is further designed for reducing a first number of polynomial coefficients in an iterative method to a lesser second number by forming a plurality of pairs of polynomial coefficients, and eliminating statistically dependent polynomial coefficients by eliminating a polynomial coefficient from each pair when a statistical correlation between the polynomial coefficients of said pair is determined to exceed a defined threshold value.

15. A non-transitory computer readable storage medium containing a computer program designed to carry out a method for calibrating a coordinate measuring machine when the computer program is executed on a control unit of the coordinate measuring machine, the method comprising the steps of:
providing a reference measurement object having known properties in a measuring volume of the coordinate measuring machine,
recording a plurality of reference measured values on a plurality of measurement points on the reference measurement object using the coordinate measuring machine,
determining calibration data using the reference measured values and using the known properties, and
storing said calibration data in a memory of said evaluation and control unit in order to enable the evaluation and control unit to computationally correct for nonlinear measuring errors of the coordinate measuring machine,
wherein the step of determining calibration data is carried out using the evaluation and control unit and comprises the steps of:
defining a polynomial transformation having a plurality of polynomial coefficients,
determining a first number of said polynomial coefficients as a function of the reference measured values and as a function of the known properties,
forming a plurality of pairs of said polynomial coefficients,
eliminating statistically dependent polynomial coefficients by eliminating one of the polynomial coefficients of each pair when a statistical correlation between the polynomial coefficients of said pair is determined to exceed a defined threshold value, thereby reducing the first number of said polynomial coefficients to a reduced second number, and
iteratively repeating said step of eliminating such that statistical dependences among the polynomial coefficients of the reduced second number are reduced, wherein the calibration data finally stored in the memory only comprises the lesser second number of polynomial coefficients.

* * * * *